United States Patent [19]

Edgar

[11] Patent Number: 5,534,945
[45] Date of Patent: Jul. 9, 1996

[54] SYSTEM AND METHOD FOR PROVIDING BLACK DIFFUSION IN VIDEO IMAGE PROCESSING

[75] Inventor: Albert D. Edgar, Travis, Tex.

[73] Assignee: International Business Machines Corporation, Armonk, N.Y.

[21] Appl. No.: 358,228

[22] Filed: Dec. 16, 1994

[51] Int. Cl.$^6$ .................................................. H04N 1/40
[52] U.S. Cl. ...................... 348/615; 348/671; 358/455; 358/465
[58] Field of Search ................................. 348/615, 671, 348/673, 680; 358/455, 456, 457, 458, 465, 466; 382/270, 271, 272, 273, 274, 275; H04N 1/40

[56] References Cited

U.S. PATENT DOCUMENTS

| | | |
|---|---|---|
| 4,389,677 | 6/1983 | Rushby et al. . |
| 4,554,593 | 11/1985 | Fox et al. ................................. 358/455 |
| 4,695,884 | 9/1987 | Anastassiou et al. . |
| 4,943,934 | 7/1990 | Hosada et al. . |
| 5,051,841 | 9/1991 | Bowers et al. . |
| 5,111,302 | 5/1992 | Can et al. . |
| 5,130,823 | 7/1992 | Bowers . |
| 5,140,432 | 8/1992 | Chan . |
| 5,172,247 | 12/1992 | Ghaderi . |
| 5,184,213 | 2/1993 | Ishida . |
| 5,201,013 | 4/1993 | Kumagai . |

*Primary Examiner*—Safet Metjahic
*Assistant Examiner*—Chris Grant
*Attorney, Agent, or Firm*—Robert M. Carwell

[57] ABSTRACT

In a system for the reproduction of natural images on a display or printer, unviewable negative brightness caused by noise or grain in individual shadow pixels, into adjacent pixels is diffused into adjacent pixels made excessively bright by the same noise or grain process. The visual effect of this diffusion produces truer, deeper blacks in shadow areas, enhances shadow contrast and detail, and reduces perceived noise in shadow areas.

20 Claims, 4 Drawing Sheets

SYSTEM AND METHOD FOR PROVIDING BLACK DIFFUSION IN VIDEO IMAGE PROCESSING

TECHNICAL FIELD

This invention relates to video signal processing and, more particularly, refers to systems and methods for enhancing images with black diffusion.

BACKGROUND OF THE INVENTION

As a result of noise, with respect to natural images input from a camera, scanner, or the like, typically half of the pixels in a pure black region may appear above zero brightness level and half below such level. When these images are printed or displayed, those pixels below the zero level due to noise perturbation are clipped to black, whereas those above zero reproduce with a shade of gray lighter than black in average with the black pixels, thereby destroying the purity of the black. This black shade clipping has further been typically known in the art to lower shadow contrasts and worsen the relative shadow grain.

In an effort to solve this problem, prior art solutions involve saturating the blacks beyond noise. However, this technique resulted in the obliteration of deep shadow contrast and detail.

Furthermore, if such natural images are to be stored, the negative brightness values pose a dilemma for the storage strategy. If negative states are allowed, this uses states to reproduce a brightness that cannot be displayed, however, if negative brightness states are not allowed, as is most common in the art, then part of the image information is lost as just described with the display or printing process.

Accordingly, a solution to the problem was needed of obtaining pure black without obscuring shadow detail.

SUMMARY OF THE INVENTION

It is accordingly an object of this invention to provide deeper blacks in printed and displayed images.

It is a further object of the invention to enhance the contrast and detail in shadow areas of printed and displayed images.

It is also an object of the invention to reduce the noise, or grain, in the shadow areas of printed and displayed images.

A further object of the invention is to increase the effective speed of an image capture system that uses the invention in the storage display or printing of captured image.

Another object of the invention is to retain shadow detail in an image to be stored in a schema that does not allow for the storage of negative brightness values.

In a system for the reproduction of natural images on a display or printer, unviewable negative brightness caused by noise or grain in individual shadow pixels is diffused into adjacent pixels made excessively bright by the same noise or grain process. The visual effect of this diffusion produces truer, deeper blacks in shadow areas, enhances shadow contrast and detail, and reduces perceived noise in shadow areas.

A method for processing digitized image pixels of an image having corresponding pixel brightness magnitudes is disclosed comprising the steps of selecting an image brightness level as a black level wherein a first magnitude corresponding to a first of said pixels is less than said black level, deriving a magnitude difference between said black level and said first magnitude, selecting adjacent pixels proximal to said first pixel having corresponding proximal pixel brightness magnitudes and altering said proximal pixel brightness magnitudes as a function of said magnitude difference to generate altered pixels.

These and other objects are achieved by the subject invention, which may be more fully understood with reference to the following description in greater detail in conjunction with the attached figures wherein:

DETAILED DESCRIPTION OF THE PREFERRED EMBODIMENT

Figure 1:
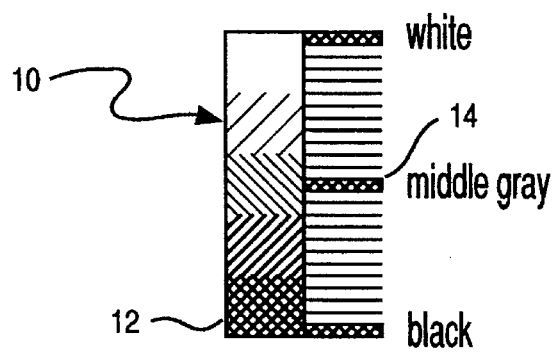
FIG. 1 is a schematic illustration of black and white defining the grayscale.

In the image arts, the importance of black tones in an image is frequently not generally realized. Black is utilized physiologically as a reference by the human eye and brain to calibrate the perception of a grayscale 10 as shown in FIG. 1. If an image has no strong blacks 12 at the lower end of the scale, the whole picture may appear faded. However, with the addition of a few points of strong black, the perception of the image may be that it appears richer. Muddy dark grays, for example, take on the appearance of a rich middle gray 14 when a strong black 12 is included somewhere in the image or picture. Similarly, muddy colors become rich pastels when a few points of deeper color are included in the image. Deep color is essentially the color equivalent of pure black in one of the color channels.

It has long been a useful technique in lithography, for example, to double print with a second plate in just the shadows to intensify black, such technique being well known in the art as "duotone". The duotone technique contributes to a significant difference between the appearance of a work as an ordinary snapshot and a significant work of art in the field of classic nature photography, for example.

In understanding the invention, it is necessary to comprehend several misunderstandings regarding the nature and role of absolute black in the image art. First, a common misconception persists that pure black has a value of absolute zero, and accordingly that no image pixels of a captured image can be below zero. The myth of this conception that pure black should have a zero value is shown at reference numeral 16 in FIG. 2. On the contrary, in fact, however, even in a well-adjusted image, many pixels do extend below the zero level as shown at reference numeral 18 in FIG. 2.

First, noise is present from several sources such as an array sensor, the film itself and the processing of the film and/or captured digital image. In total darkness, in reality substantially half of the pixels may be thought of as being above the zero level and half the pixels below the zero level as shown at reference numeral 18. It is only together that these pixels average to zero level. A pure zero level black can occur only when there is no noise to perturb the true level above and below zero.

As yet a second basis for the notion that pixels in fact should and do extend below the zero level, a phenomenon known in the image arts as overshoot is typically present in image processing. If all edges of an image were perfectly aligned with pixels in a digital image system, pixels 20 in FIG. 3 would appear as illustrated therein in the leftmost portion of the diagram. However, in practice it is known that edges of an image actually will fall in between pixels such as the edges 22 depicted between pixels 20 ill the rightmost portion of FIG. 4. It is desired that these pixels overshoot so as to retain the appearance of a sharp edge, and, in a mathematically pure image, these values will lie on a mathematical function which is the convolution of the step function and a function known as a "sinc" function which overshoots to negative black when stepping to black.

Figure 4:
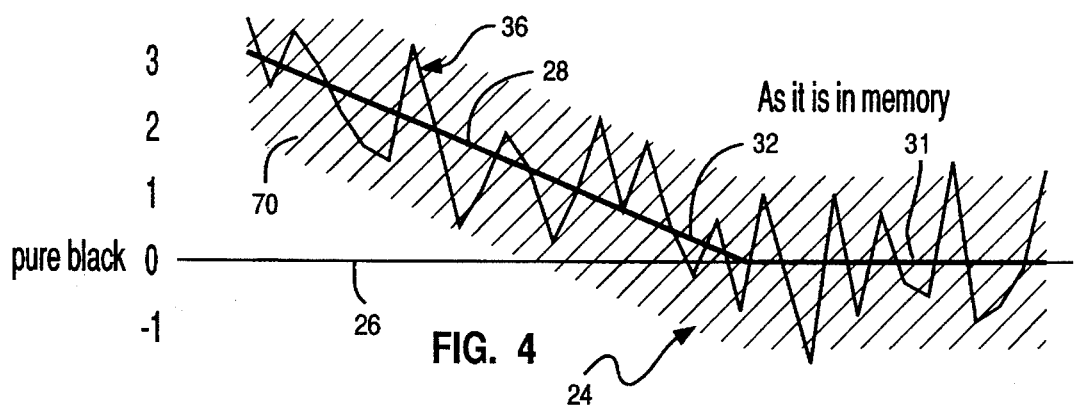
FIG. 4 illustrates image pixel values in memory prior to printing.

Referring now to FIG. 4, an actual image 36 shown having varying density with spatial position represents an average line 28 illustrating the idealized image over which is superimposed noise that causes image line 36 to deviate around average line 28 within a region illustrated by shaded region 70. Average line 28 at some part of the image 31 attains pure black represented by zero line 26.

Figure 2:
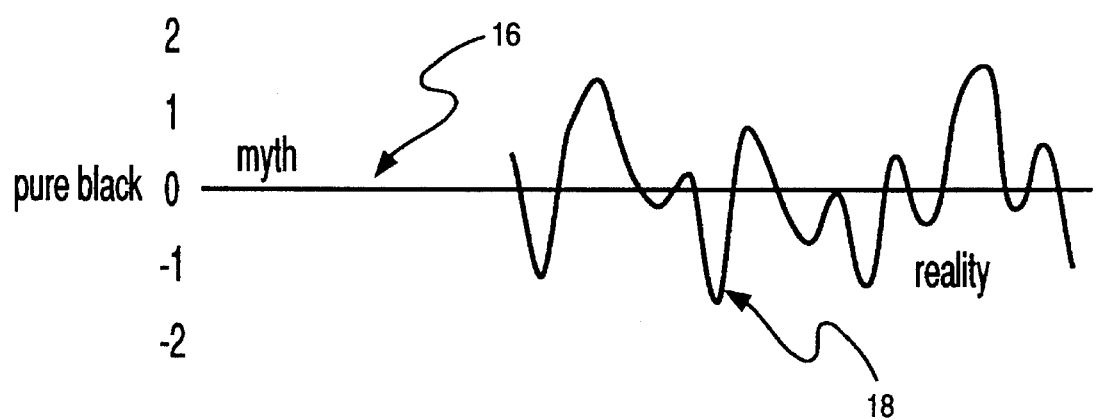
FIG. 2 is an illustration of image pels below zero and well-adjusted images.
Figure 3:
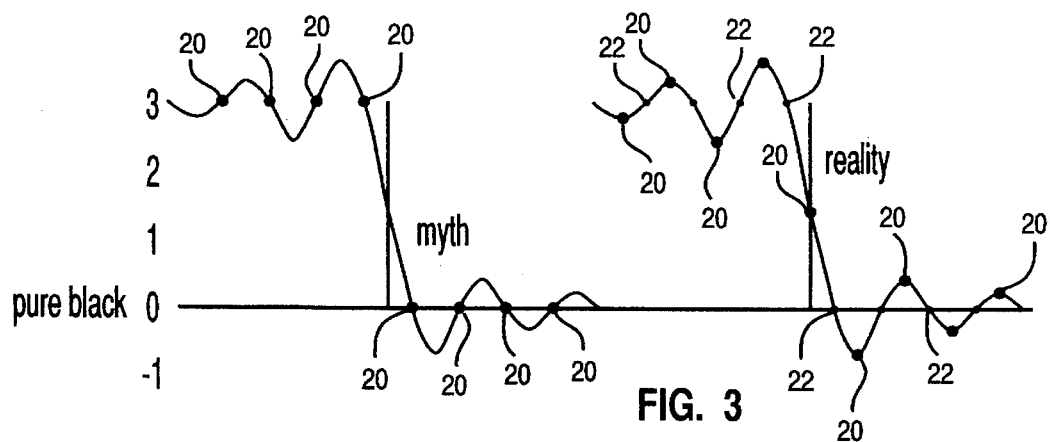
FIG. 3 illustrates the effect of image edges between pixels.
Figure 5:
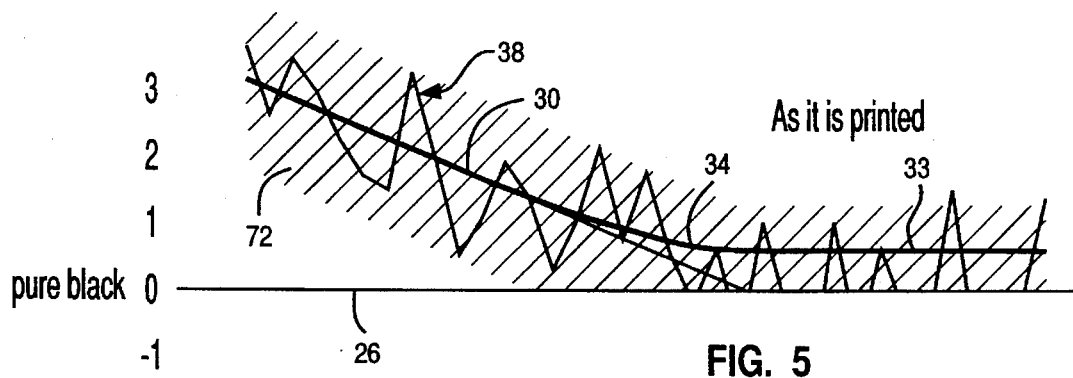
FIG. 5 illustrates image pixel values after clipping when the image is printed.

Although, as thus explained with reference to FIGS. 2 and 3, image pixels are negative, nevertheless as previously explained, printers and displays typically clip brightness at the zero signal level because it is obviously impossible to display negative brightness or absorb more than all of the light with a dye. As shown in FIG. 4, the image pixels in the memory of an image system will in fact thus include pixels having negative values shown by the region 24 of the diagram in FIG. 4 extending below the zero line 26. However, as just explained, as a result of printer and display clipping of brightness at zero, shown by the omission of the region 24 of FIG. 4 in FIG. 5 for comparison, a region averaging pure black will therefore print in average as a dark gray, thereby undesirably muddying the picture or image. Also, the effect of such clipping is to cause shadow contrasts to fall, as may be seen by noting segment 34 of average line 30 has less slope than the equivalent segment 32 of average line 28 in FIG. 4. However, grain does not fall as rapidly, as noted by the variation of actual line 38 from average line 31 in the shaded region of FIG. 5 and by the width of shaded region 72, thereby giving rise to a worsening of relative graininess. A pure black is actually attainable in the prior art only by supersaturating the image beyond the noise level which, in turn, obliterates all of the extreme shadow detail.

As an illustration of the seriousness of this phenomenon to the emergent art of digital signal processing,, film which has been scanned nominally, for example, at 1000 pixel lines per inch has under the assumption of a "white" noise spectrum, twice the noise per pixel as film scanned at 500 pixel lines per inch. (e.g. VGA resolution) because each pixel covers a quarter of the area. From a distance, the eye averages more pixels from the higher resolution image to perceive the same grain. However, the muddying effects on grays increases with the individual pixel noise, so in this example the muddying effect doubles with twice the resolution. As the image market moves to higher and higher resolutions, for example 2000 pixel lines per inch with a common image CD ROM and 4000 per inch with a typical film scanner designed for the motion picture industry, it will thus be readily appreciated that the hereinbefore detailed grayscale problem becomes far more troublesome, and it is this problem which has been addressed by the subject invention.

In a sense, shadow detail is the most expensive detail to achieve in imagery because the desired level of such detail is the parameter which dictates the necessary film or array sensor speed, wherein such speed is a significant cost factor in imaging systems. In a sense, pure blacks are the most important part of the grayscale of FIG. 1 inasmuch as they essentially will set the psychologically perceived dynamic range of the image. It is a feature of the invention to significantly improve such shadow detail and dynamic range.

The invention applies a technique similar to that known in the art as palette error diffusion. When a display or printer clips a negative value to zero, as previously described with references to FIGS. 4 and 5, it introduces an error into the image. A counteraction to this error is diffused to adjoining pixels. If such adjoining pixels had a positive value, the error would subtract from that positive value so as to cancel the net average error, thus causing a region of several pixels to average to the correct brightness, thereby preserving the grayscale, contrast, area detail, and black strength.

Figure 6:
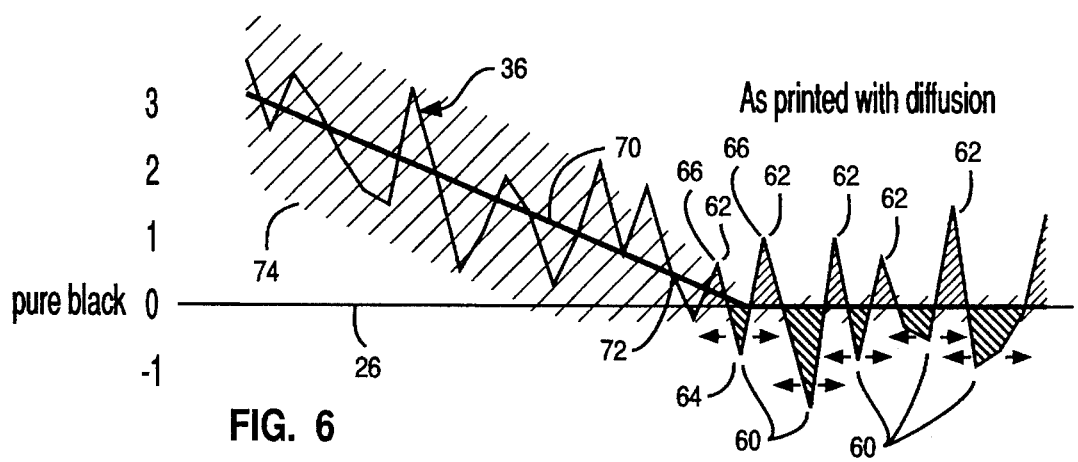
FIG. 6 illustrates black error diffusion for use when displays and printers clip negative image pixel values to zero.

Turning to FIG. 6, the aforementioned effect of printing with diffusion may be seen graphically illustrated. More particularly, an image as recorded in memory 36 approaches a shadow region limited by pure black 26. In the shadow, as described above, some of the image, due to noise, will have values 60 darker than pure black. These values cannot print darker than pure black, leaving an "error". In the prior art, this error was simply accepted and the next pixels printed. The current invention retains this error as a debt that can be made good by adjoining pixels 62 that are lighter than black.

Specifically, still referring to FIG. 6, a pixel 64 is encountered that is lower that pure black 26. Because it is known that the real world does not contain negative brightness (there are no negative photons), this pixel is known to have a negative noise spike added to it. Because of the high frequency nature of noise, if one encounters a negative noise spike, it will probably be adjacent to a positive noise spike causing adjacent pixels 66 to be positive. By reducing the height of these adjacent positive pixels 66 by the amount the negative pixel 64 dropped below the darkest printable black 26, the visual effect of averaging over the region encompassing both pixel 64 and pixels 66 is the correct level of black as though the negative black of pixel 64 was actually printed. This average curve 70 is seen to match the intended average curve 28 in FIG. 4, and in particular the slope of region 72 of the average curve in FIG. 6 near the darkest shadows is seen to match the slope 32 of FIG. 4 with no loss in contrast.

Furthermore, because it was known that pixel 64 contained a negative noise spike, by removing this noise spike and placing it to cancel a pixel with a high probability of having a positive noise spike, actual noise is reduced, shown in FIG. 6 as a shrinking of noise region 74 in the shadow area.

The consequence of the forgoing is quite significant. If this curve 36 represented a film image, then by retaining better shadow contrast, the effective speed of the film is increased while the noise grain is decreased, this in addition to obtaining the aesthetic enhancement of purer deeper blacks.

It may be helpful conceptually to further describe the invention by analogy to chemical practice. If a chemical was created by pixels having a negative value which cancelled light, such chemical might be diffused through the image until it was absorbed by and cancelled light from adjoining positive pixels. Thus, the average light from a region which would result would be the average of all pixels, both positive and negative. In implementing the foregoing approach, numerous complications present themselves regarding the need, for example, to include diffusing homogeneously in all directions, and limiting the range of effect to prevent the appearance of undercut. Although it is possible to consider the problem of distributing the negative blacks to be one of classical error diffusion, employing techniques well known in the art, the unique aspects of this case present certain opportunities for improvement. For example, because the "palette" above zero may be considered infinite, bidirectal symmeture diffusion is possible.

Figure 7:
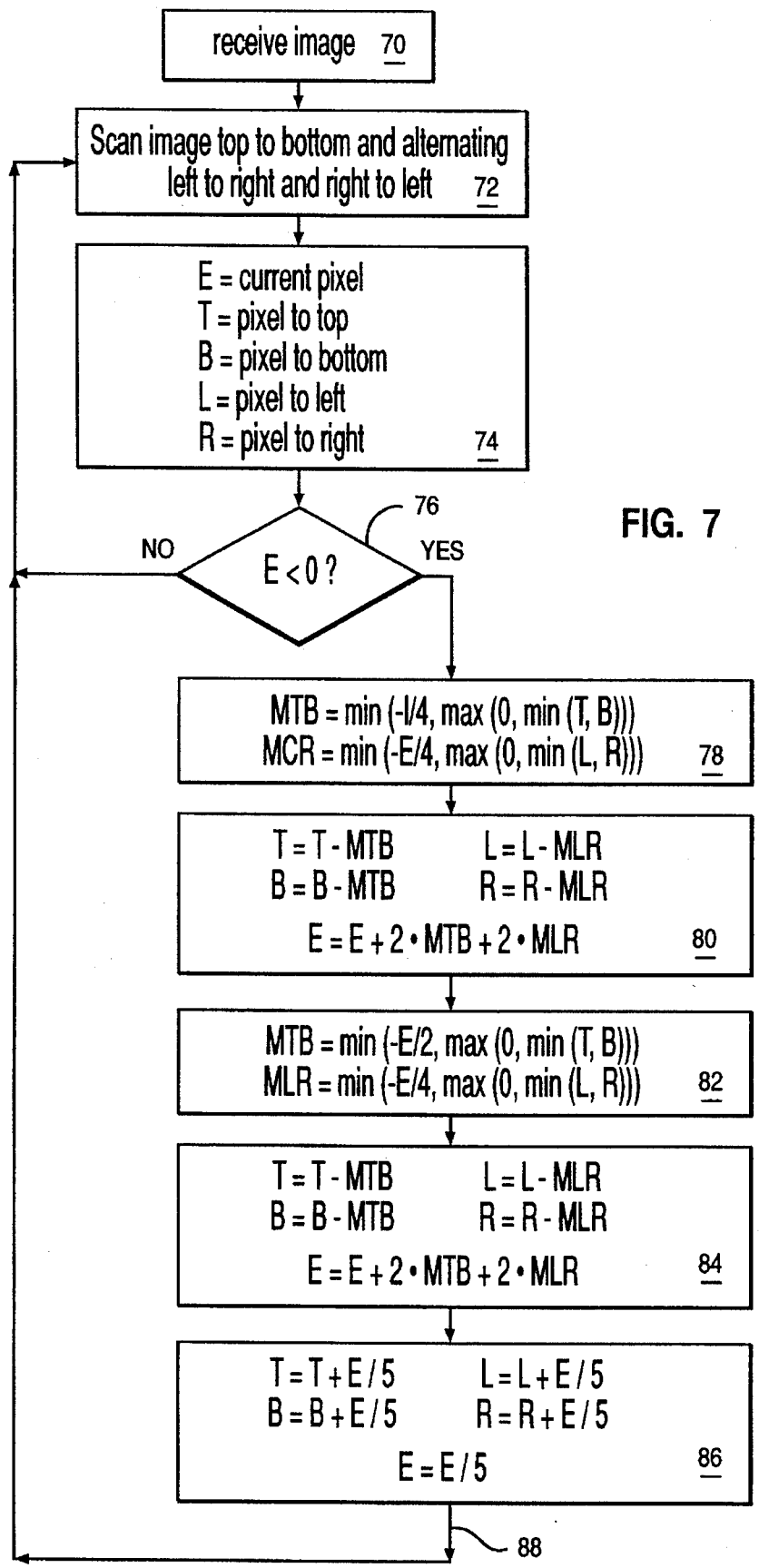
FIG. 7 is a flow diagram for a computer program implementable on the system of FIG. 7 to effect a color computer display image to print in accordance with the invention.
Figure 8:
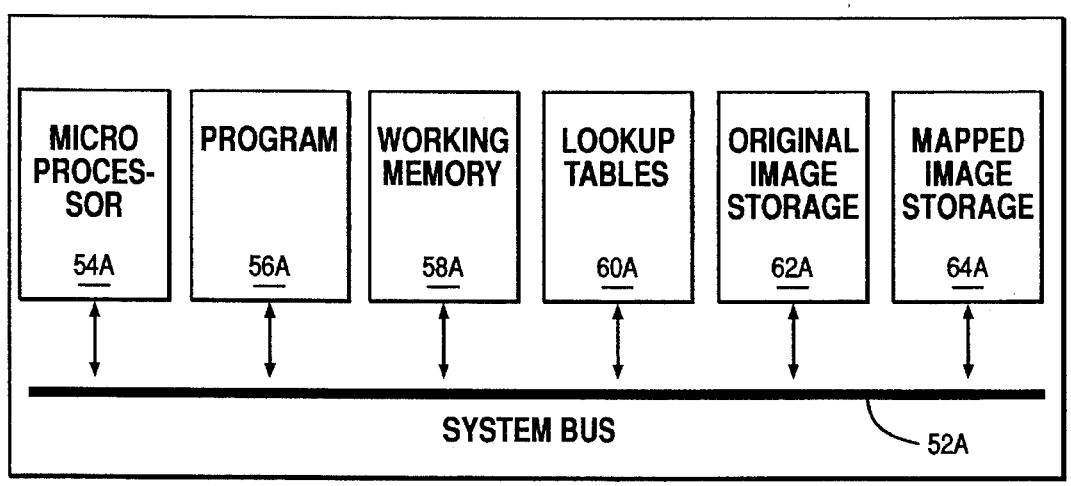
FIG. 8 is a computer system on which the computer program of FIG. 6 may be implemented.
Figure 8:
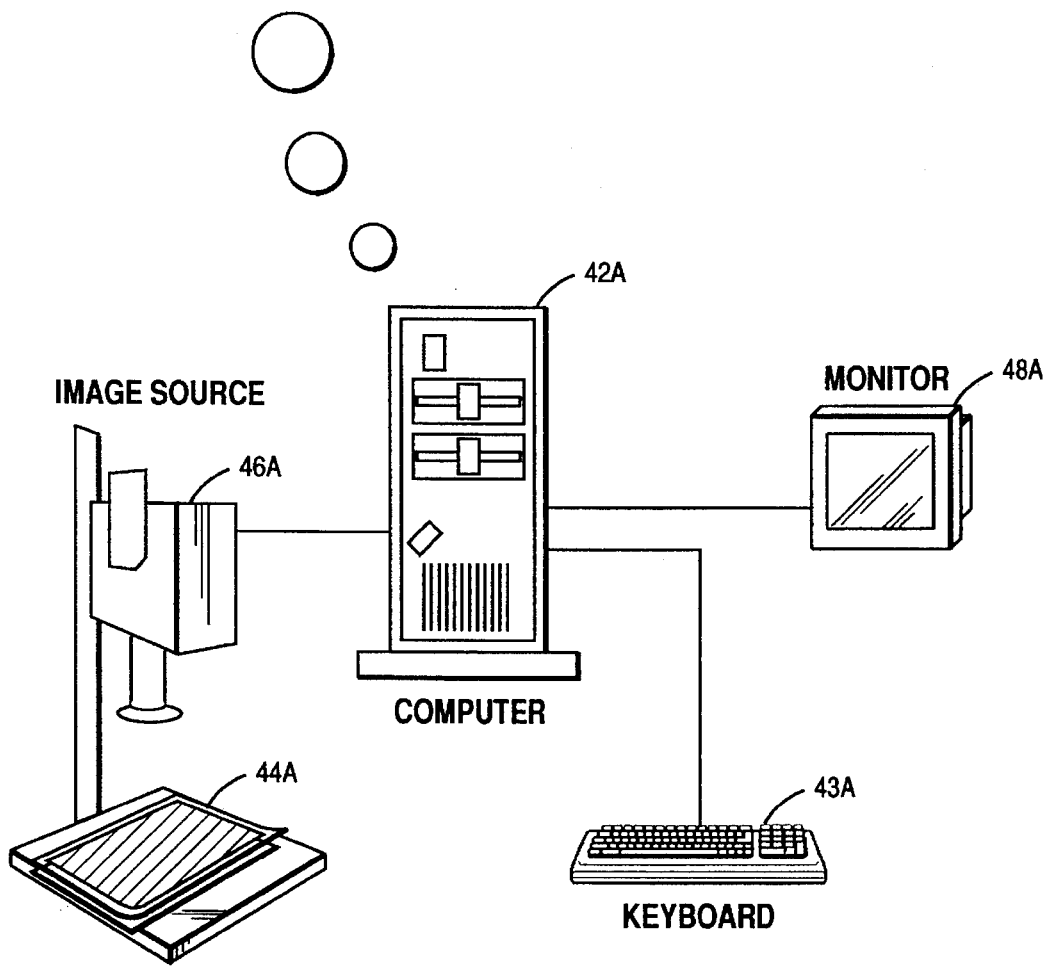

Turning now to FIG. 7, a flow diagram is provided of image processing which, when implemented, in the system of FIG. 8 by means of program code executing on the system, will result in the black diffusion technique of the invention. The embodiment of the flow diagram shown in FIG. 7 will be seen to be a single pass implementation which considers adjacent left and right pixels and adjacent top and bottom pixels of a captured image as pairs. The embodiment distributes the error equally between members of a pair so as to achieve a symmetric diffusion. If error is to be distributed equally to both members of a pair, then the total error distributed to a pair is twice the amount that can be absorbed by the weakest, or least positive, member of the pair. Moreover, if both pairs together are unable to absorb the error, the remainder is distributed equally to all four pixels, e.g. those above and below, to the left, and to the right, perhaps leaving negative values. Because the implementation is a single pass implementation in the preferred embodiment depicted, half of the residue is put up for the next cycle, thereby providing a damping.

A specific implementation will now be given in reference to the flowchart of FIG. 7.

In block 70, an image is received having rows and columns of pixels. Each pixel contains magnitude representing brightness- Pure black is assumed to be zero magnitude. Some of the pixels contain a negative magnitude. The algorithm will attempt to distribute this negative magnitude to adjacent positive pixels in a visually acceptable manner.

In block 72, the pixels in the image are scanned so that each pixel may be processed. In block 74, E will be used to represent the magnitude of the current pixel, T, the pixel to the top, B, the pixel to the bottom, and L and R the magnitudes of the pixels to the left and right of the current pixel, respectively.

Block 76 tests the magnitude of the current pixel. If that magnitude is negative, then the value E represents an error in brightness that will be made in display or printing assuming that zero is the darkest that can be displayed or printed.

First, an attempt is made to distribute this error equally with a fourth to each of four adjacent positions. In block 78, this distribution is attempted under the constraint that among each pair, L and R, and T and B, the distribution must be equal and is therefore limited in magnitude by the least positive member of the pair. In block 80, the distribution calculated in block 78 is applied.

If there is still a negative E remaining, then at least one of the two pairs was not able to absorb the requested excess darkness, so in blocks 82 and 84 a similar attempt is made to distribute the residue darkness to a remaining unsaturated pair. If there is still a residue left, then block 86 just distributes this evenly knowing that some pixels will remain or be made negative. Some of this negative will be absorbed in the processing of subsequent pixels. It is usually desired that not all be retained and eventually absorbed several pixels away to avoid an appearance of "undercut" in the image.

Finally, branch 88 returns processing to the next pixel in order of scan.

Although the invention is described in relation to printing and display, it also has application to image storage. A typical image storage schema for digital computer memory assigns an 8-bit value to the brightness of each color channel of each pixel. Usually, the state 255 is assigned to white, and the state 0 is assigned to black, with states 1 to 254 assigned to states of gray. This invention as described may be applied to the image prior to storage with the same ultimate effect as if it was applied just prior to display or printing, with the benefit that with the invention the storage schema can follow the convention of assigning state zero to pure black.

Furthermore, the invention may be obviously extended to diffuse noise around pure white so the image may be limited to a storage schema wherein the highest storage state is assigned to pure white, or the printer or display is not capable of printing a value lighter than pure white. In this case, the value E discussed in relation to FIG. 7 is the magnitude above pure white, and that value is added, rather than subtracted from adjacent pixels that are below the value for pure white.

Referring finally to FIG. 8, a typical system providing the environment for implementing the invention may be seen depicted therein. A computer 42A, such as a PS/2 (trademark of the IBM Corporation) personal computer system will execute the steps of the invention with a program loaded therein implementing the processes and methods previously described, including the software flow diagram of FIG. 6. In order to have images to operate upon, the computer may also be used to first capture, by means of an appropriate source, such as a camera 46A, scanner, or via some other medium, an image based upon a source object 44A, which the computer 42A will thence digitize for subsequent processing in a manner well known in the art. The mapped image created in accordance with the invention may be stored for display on a conventional monitor 48A for human observation or otherwise stored on media for eventual display.

A conventional keyboard 43A and other I/O and user interface devices will further be provided to the computer 42A for interacting to effect the invention. Inside the computer 42A, a system bus 52A is provided which ties together the microprocessor 54A, the previously described programs 56A, which instruct the microprocessor 54A how to execute the steps of the invention, and working memory 58A. This memory 58A is utilized by the microprocessor 54A to store intermediate calculations employed in accordance with the method of the invention. Additionally, stored in memory and interconnected to the system bus 52A may be various lookup tables generally represented at reference numeral 60A, the original stored image 62A captured by the camera 46A and a mapped image 64A as desired which may be generated from the steps described.

While the invention has been shown and described with reference to particular embodiments thereof, it will be understood by those skilled in the art that the foregoing and other changes in form and detail may be made therein without departing from the spirit and scope of the invention.

I claim:

1. A method for processing digitized image pixels of an image having corresponding pixel brightness magnitudes, comprising the steps of:

selecting an image brightness level as a black level wherein a first magnitude corresponding to a first of said pixels is less than said black level;

deriving a magnitude difference between said black level and said first magnitude;

selecting adjacent pixels proximal to said first pixel having corresponding proximal pixel brightness magnitudes; and altering said proximal pixel brightness magnitudes as a function of said magnitude difference to generate altered pixels.

2. The method of claim 1 wherein said proximal pixel brightness magnitudes are altered by subtracting a portion of said magnitude difference therefrom.

3. The method of claim 2 further including generating on a display an image corresponding to said altered pixels.

4. The method of claim 3 further including determining the darkest level which said display reproduces; and wherein said black level is said darkest level.

5. The method of claim 2 further including:

selecting a printer for printing said image; and determining the darkest level which said printer reproduces, wherein said black level is said darkest level.

6. The method of claim 1 wherein said step of selecting adjacent pixels comprises:

selecting said adjacent pixels having said proximal pixel brightness magnitudes greater than said black level.

7. The method of claim 6 wherein said adjacent pixels are above, below, and to the right, left, and adjacent said first pixel.

8. The method of claim 1 further including storing, after said altering, said altered proximal pixel brightness magnitudes, in nonvolatile memory.

9. A method for processing a digitized image, comprising:

detecting an error associated with a black level of a pixel in said image having proximal pixels disposed thereabout; and diffusing said error associated with said pixel to said proximal pixels with symmetric diffusion wherein said proximal pixels comprise at least a first pair of pixels, each pair further comprising adjacent pixels disposed on a opposing sides of said pixel; and wherein said method further includes:

determining the brightness levels of said adjacent pixels;

selecting the minimum one of said brightness levels of said adjacent pixels corresponding to one of said adjacent pixels;

defining a magnitude of error absorbable by said first pair of adjacent pixels as equal to or less than said minimum brightness level; and diffusing said error from said pixel to said first pair of adjacent pixels by an amount corresponding to said magnitude of error absorbable by said first pair of adjacent pixels.

10. A system for processing digitized image pixels of an image having corresponding pixel brightness magnitudes, comprising:

means for selecting an image brightness level as a function of said magnitudes of said image as a black level and wherein a first magnitude corresponding to a first of said pixels is less than said black level;

means for deriving a magnitude difference between said image brightness level and said first magnitude;

means for selecting adjacent pixels which are proximal to said first pixel having corresponding proximal pixel brightness magnitudes; and means for altering said proximal pixel brightness magnitudes as a function of said magnitude difference to generate altered pixels.

11. The system of claim 10 wherein said proximal pixel brightness magnitudes are altered by subtracting a portion of said magnitude difference therefrom.

12. The system of claim 11 further including means for generating on a display an image corresponding to said altered pixels.

13. The system of claim 12 further including means for determining the darkest level which said display reproduces; and wherein said black level is said darkest level.

14. The system of claim 11 further including:

means for selecting a printer for printing said image; and means for determining the darkest level which said printer reproduces, wherein said black level is said darkest level.

15. The system of claim 10 wherein said means for selecting said adjacent pixels includes:

means for selecting said adjacent pixels having said proximal pixel brightness magnitudes greater than said black level.

16. The system of claim 15 wherein said adjacent pixels are above, below, and to the right, left, and adjacent said first pixel.

17. The system of claim 10 further including means for storing said altered proximal pixel brightness magnitudes, in nonvolatile memory.

18. A system for processing a digitized image, comprising:

means for detecting an error associated with a black level of a pixel in said image having proximal pixels disposed thereabout; and means for diffusing said error associated with said pixel to said proximal pixels with symmetric diffusion, wherein said proximal pixels compromise at least a first pair of pixels, each pair further comprising adjacent pixels disposed on a opposing sides of said pixel; and wherein said system further includes:

means for determining the brightness levels of said adjacent pixels;

means for selecting the minimum one of said brightness levels of said adjacent pixels corresponding to one of said adjacent pixels;

means for defining a magnitude of error absorbable by said first pair of adjacent pixels as equal to or less than said minimum brightness level; and means for diffusing said error from said pixel to said first fair of adjacent pixels by an amount corresponding to said magnitude of error absorbable by said first pair of adjacent pixels.

19. A method for processing digitized image pixels of an image having corresponding pixel brightness magnitudes, comprising the steps of:

selecting an image brightness level as a white level and wherein a first magnitude corresponding to a first of said pixels is greater than said white level;

deriving a magnitude difference between said white level and said first magnitude;

selecting adjacent pixels proximal to said first pixel having corresponding proximal pixel brightness magnitudes; and altering said proximal pixel brightness magnitudes as a function of said magnitude difference to generate altered pixels.

20. A system for processing digitized image pixels of an image having corresponding pixel brightness magnitudes, comprising:

means for selecting an image brightness level as a white level and wherein a first magnitude corresponding to a first of said pixels is greater than said white level;

means for deriving a magnitude difference between said white level and said first magnitude;

means for selecting adjacent pixels proximal to said first pixel having corresponding proximal pixel brightness magnitudes; and means for altering said proximal pixel brightness magnitudes as a function of said magnitude difference to generate altered pixels.

* * * * *